(12) United States Patent
Park et al.

(10) Patent No.: US 8,546,023 B2
(45) Date of Patent: Oct. 1, 2013

(54) SECONDARY BATTERY COMPRISING TERNARY EUTECTIC MIXTURES AND PREPARATION METHOD THEREOF

(75) Inventors: Jiwon Park, Daejeon (KR); Jae Seung Oh, Seoul (KR); Byoung-bae Lee, Cheonan-si (KR); Shin Jung Choi, Iksan-si (KR); Jaeduk Park, Daejeon (KR)

(73) Assignee: LG Chem, Ltd. (KR)

( * ) Notice: Subject to any disclaimer, the term of this patent is extended or adjusted under 35 U.S.C. 154(b) by 835 days.

(21) Appl. No.: 12/595,287

(22) PCT Filed: Apr. 10, 2008

(86) PCT No.: PCT/KR2008/002023
§ 371 (c)(1),
(2), (4) Date: Apr. 6, 2010

(87) PCT Pub. No.: WO2008/127021
PCT Pub. Date: Oct. 23, 2008

(65) Prior Publication Data
US 2010/0196766 A1 Aug. 5, 2010

(30) Foreign Application Priority Data

Apr. 11, 2007 (KR) .................. 10-2007-0035760

(51) Int. Cl.
*H01M 6/16* (2006.01)
(52) U.S. Cl.
USPC ........... 429/324; 429/326; 429/327; 429/329; 429/330; 429/331; 429/332; 429/336; 429/338; 429/339; 429/340; 429/341; 429/342

(58) Field of Classification Search
USPC .......................... 429/188, 189, 324, 326–343
See application file for complete search history.

(56) References Cited

U.S. PATENT DOCUMENTS

| 5,362,581 A | 11/1994 | Chang et al. |
| 5,885,733 A | 3/1999 | Ohsawa et al. |

(Continued)

FOREIGN PATENT DOCUMENTS

| CN | 1371141 A | 9/2002 |
| CN | 1929185 A | 3/2007 |

(Continued)

OTHER PUBLICATIONS

International Search Report, PCT/KR2008/002023, dated Jun. 15, 2008, acknolwedged, English translation not provided.

(Continued)

*Primary Examiner* — Basia Ridley
*Assistant Examiner* — Heng Chan
(74) *Attorney, Agent, or Firm* — Lerner, David, Littenberg, Krumholz & Mentlik, LLP (57) ABSTRACT

Disclosed is a secondary battery including a cathode, an anode, a separator, and an electrolyte, wherein the electrolyte includes a ternary eutectic mixture prepared by adding (c) a carbonate-based compound to a eutectic mixture containing (a) an amide group-containing compound and (b) an ionizable lithium salt, and the carbonate-based compound is included in an amount of less than 50 parts by weight based on 100 parts by weight of the electrolyte. The use of the disclosed ternary eutectic mixture having flame resistance, chemical stability, high conductivity, and a broad electrochemical window, as the electrolyte material, improves both the thermal stability and quality of the battery.

13 Claims, 2 Drawing Sheets

(56) References Cited

U.S. PATENT DOCUMENTS

| | | |
|---|---|---|
| 2003/0096163 A1 | 5/2003 | Miyake et al. |
| 2004/0072080 A1 | 4/2004 | Iwanaga et al. |
| 2005/0014063 A1* | 1/2005 | Shi et al. .................. 429/144 |
| 2006/0072182 A1 | 4/2006 | Oh et al. |
| 2007/0212615 A1* | 9/2007 | Jost et al. .................. 429/326 |
| 2010/0239917 A1* | 9/2010 | Lee et al. .................. 429/303 |

FOREIGN PATENT DOCUMENTS

| | | | |
|---|---|---|---|
| JP | 04-094066 | | 3/1992 |
| JP | 06-005309 | | 1/1994 |
| JP | 07211350 | A | 8/1995 |
| JP | 11-121037 | A | 4/1999 |
| JP | 11260400 | A | 9/1999 |
| JP | 11307121 | A | 11/1999 |
| JP | 2000306602 | A | 11/2000 |
| JP | 2000348759 | A * | 12/2000 |
| JP | 2000348760 | A | 12/2000 |
| JP | 2000348761 | A * | 12/2000 |
| JP | 2003203674 | A | 7/2003 |
| JP | 2004071245 | A | 3/2004 |
| JP | 2004127543 | A | 4/2004 |
| JP | 2005108595 | A | 4/2005 |
| JP | 2006019070 | A | 1/2006 |
| JP | 2006024407 | A | 1/2006 |
| KR | 20000002445 | A | 1/2000 |
| KR | 20050122065 | A | 12/2005 |
| KR | 20060021222 | A | 3/2006 |
| KR | 20060051332 | A | 5/2006 |
| WO | WO 2005104288 A1 * | | 11/2005 |
| WO | 2006033545 A1 | | 3/2006 |
| WO | WO 2008088167 A1 * | | 7/2008 |

OTHER PUBLICATIONS

Hu et al., "Novel room temperature molten salt electrolyte based on LiTFSI and acetamide for lithium batteries", Electrochemistry Communications USE, ISE, 2004 vol. 6, pp. 28-32.

* cited by examiner

SECONDARY BATTERY COMPRISING TERNARY EUTECTIC MIXTURES AND PREPARATION METHOD THEREOF

CROSS REFERENCE TO RELATED APPLICATIONS

The present application is a national phase entry under 35 U.S.C. §371 of International Application No. PCT/KR2008/002023, filed Apr. 10, 2008, published in English, which claims priority from Korean Patent Application No. 10-2007-0035760, filed Apr. 11, 2007, all of which are incorporated herein by reference.

TECHNICAL FIELD

The present invention relates to an electrolyte for a battery comprising a ternary eutectic mixture (TEM) and a secondary battery having improved safety and quality by using the above electrolyte.

BACKGROUND ART

Recently, interests in energy storage technology have been gradually increasing. As the use of batteries is enlarged to applications for the storage of energy for portable telephones, camcorders, notebook computers, personal computers and electric vehicles, efforts on the research and development of batteries are increasingly embodied. In this view, the field of chargeable/dischargeable secondary batteries receives the greatest attention, and among them, interests in the development of lithium secondary batteries, which have a high energy density and a long cycle life, are focused upon.

In general, the lithium secondary batteries comprise a lithium metal oxide as a cathode active material, a carbonaceous material or a lithium metal alloy as an anode active material, and a solution containing a lithium salt dissolved in an organic solvent as an electrolyte. In the lithium metal oxide used as the cathode active material, the structural stability and capacity change according to intercalation and deintercalation of lithium ions. When a charge potential increases, the capacity increases, but a compound becomes structurally unstable. Such instability in an electrode structure may generate oxygen, thereby resulting in overheating within a battery, or causing explosion of the battery by a reaction with an electrolyte.

Organic solvents that have been used widely in recent years include ethylene carbonate, propylene carbonate, ethylmethyl carbonate, dimethoxyethane, gamma-butyrolactone (GBL), N,N-dimethyl formamide, tetrahydrofuran or acetonitrile. However, the organic solvents have enough volatility to cause evaporation, and are also highly ignitable, and thus are problematic in terms of stability under overcharge, overdischarge, short circuit and high temperature conditions, when applied to a lithium ion secondary battery.

More recently, many attempts including the use of a noninflammable ionic liquid as an electrolyte have been made mainly in Japan and USA in order to solve the above-mentioned problems. However, such a noninflammable ionic liquid has not been practically used yet because when the noninflammable ionic liquid is used together with the anode using a carbon based material and/or a lithium metal, the ionic liquid is reduced in advance of lithium ions at a higher voltage, or conductivity of lithium ions decreases due to high viscosity of the ionic liquid. Therefore, to overcome such disadvantages of the conventional organic electrolytes and ionic liquids, various attempts have been made to modify an electrode active material or develop a novel electrolyte containing an additive.

DISCLOSURE OF INVENTION

Technical Problem

Therefore, the present invention has been made in view of the above-mentioned problems. The inventors of the present invention have conducted many studies to provide an electrolyte for a secondary battery by using a cost-efficient eutectic mixture having excellent thermal and chemical stability.

However, we have recognized that when an electrolyte containing a eutectic mixture is used in combination with a conventional carbonaceous material-based anode, the electrolyte is decomposed due to electrochemical reactions generated at a potential ($Li/Li^+$) beyond the chemical window of the eutectic mixture, resulting in degradation of the quality of a battery.

The inventors of the present invention have found that the addition of a certain amount of a carbonate-based compound to the eutectic mixture may prevent the electrolyte, including the eutectic mixture from being decomposed at a potential ($Li/Li^+$) beyond the electrochemical window of the eutectic mixture, and herein, high volatility and ignitability of the carbonate-based compound are minimized, thereby allowing flame resistance, chemical stability and high conductivity of the eutectic mixture to be sufficiently shown. The present invention is based on the facts.

Technical Solution

According to an aspect of the present invention, there is provided a secondary battery including a cathode, an anode, a separator, and an electrolyte, and an electrolyte for the battery, wherein the electrolyte includes a ternary eutectic mixture prepared by adding (c) a carbonate-based compound to a eutectic mixture containing (a) an amide group-containing compound and (b) an ionizable lithium salt, and the carbonate-based compound is included in an amount of less than 50 parts by weight based on 100 parts by weight of the electrolyte.

Hereinafter, the present invention will be explained in more detail.

The secondary battery according to the present invention includes, as an electrolyte, the ternary eutectic mixture (TEM) prepared by adding a certain amount (for example, an amount of less than 50 parts by weight) of the carbonate-based compound to the eutectic mixture.

The conventional carbonate-based compound has caused evaporation and exhaustion of an electrolyte due to high volatility, and has significantly lowered thermal stability of the battery due to high ignitability. However, in the present invention, although the carbonate-based compound is used as a constitutional element of a ternary eutectic mixture, the content of the carbonate-based compound is adjusted within a certain range, thereby minimizing ignitability and increasing flame resistance. Accordingly, it is possible to secure thermal stability of the battery.

Figure 1:
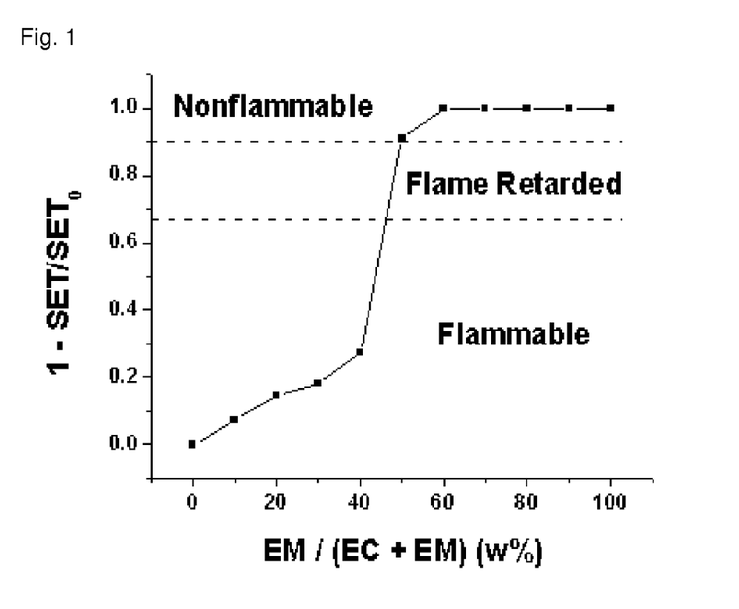
FIG. 1 illustrates a self extinguish time measured according to a change in a component ratio of a ternary eutectic mixture.

Actually, it has been found that although the carbonate-based compound is used in the present invention, flame resistance is showed in that a relative self-extinguish time ($1-SET_{TEM}/SET_C$) satisfies the range of $0.67 < 1-SET_{TEM}/SET_C < 1$ (see FIG. 1).

Meanwhile, viscosity of the solution and ion concentration in the solution affects the ion conductivity. When the viscosity of the solution decreases, ions can move more freely and thus ion conductivity increases. When the concentration of ions in the solution increases, the amount of ions increases and thus ion conductivity also increases. In the present invention, the use of the carbonate-based compound as a constitutional element of a ternary eutectic mixture decreases viscosity of an electrolyte and increases ion conductivity, and thus the ion-transferring property of the electrolyte increases, thereby improving the quality of a second battery.

Further, when an electrolyte using such an eutectic mixture alone, which consists of the lithium-containing salt and the amide group-containing compound, is used in combination with a carbonaceous material as the anode active material to form a secondary battery, decomposition of an electrolyte and degradation of the quality of the secondary battery occur due to electrochemical reactions of the anode generated at a potential (e.g. 0~1V) beyond the electrochemical window of the eutectic mixture.

In other words, when an electrochemical reaction occurs under a potential beyond the electrochemical window of an electrolyte at either of the cathode or the anode of the battery during charge/discharge cycles of the battery, electrolyte decomposition occurs. For example, when a carbonaceous material having a potential vs. lithium potential of 0~1V is used as the anode active material in combination with the battery mixture having an electrochemical window of 1V or more as an electrolyte, reduction occurs at the anode due to the potential beyond the electrochemical window, thereby causing decomposition of the eutectic mixture, resulting in a rapid drop in the initial capacity and lifespan of the battery.

Figure 3:
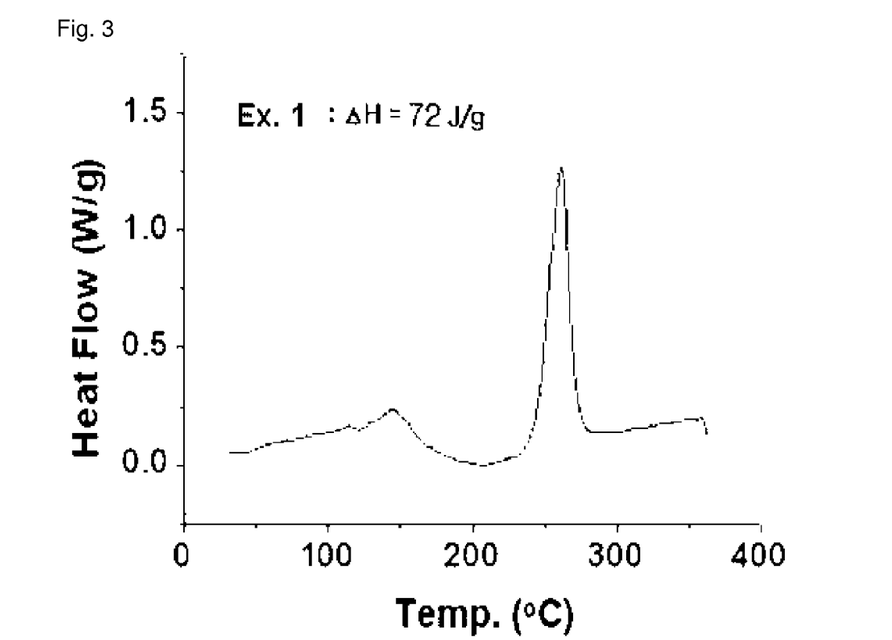
FIG. 3 is a graph illustrating a differential scanning calorimetry (DSC) analysis on a charged $LiCoO_2$ electrode in a lithium secondary battery prepared by Example 1, which is using a ternary eutectic mixture as an electrolyte.

On the other hand, in the present invention, the carbonate-based compound forms the anode protective layer at a potential (Li/Li$^+$) beyond the electrochemical window of the battery mixture, thereby solving the problems, such as decomposition of the battery mixture-containing electrolyte at the potential, and degradation of the quality of the battery (see FIG. 3).

Actually, the use of a ternary eutectic mixture according to the present invention may minimize disadvantages of a binary eutectic mixture and the carbonate-based compound, respectively, and cause a synergy effect through interactions of only their advantages.

The electrolyte for the battery according to the present invention may include a ternary eutectic mixture prepared by adding the carbonate-based compound in an amount of less than 50 parts by weight to a binary eutectic mixture.

The carbonate-based compound (c) may include a conventional carbonate compound known in the art without limitations. Also, the carbonate-based compound has a cyclic structure, a linear structure, or a combination thereof, and may be substituted or unsubstituted for a halogen atom. Non-limiting examples of such carbonate-based compounds include propylene carbonate (PC), ethylene carbonate (EC), diethyl carbonate (DEC), dimethyl carbonate (DMC), dipropyl carbonate (DPC), butylene carbonate, methylpropyl carbonate, ethylpropyl carbonate, dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone or mixture thereof.

Also, the carbonate-based compound may be used in an amount of less than 50 parts by weight, preferably of 0.001 to 40 parts by weight, based on 100 parts by weight of an electrolyte. Herein, the content of the carbonate may be based on 100 parts by weight of a total electrolyte, or based on 100 parts by weight of an electrolyte excluding a lithium salt.

The electrolyte material to which the above described carbonate-based compound is added in a certain amount is a binary eutectic mixture.

Generally, the battery mixture is referred to as a mixture containing two or more substances and having a decreased melting point. Particularly, such eutectic mixtures include mixed salts present in a liquid phase at room temperature. Herein, room temperature means a temperature of up to 100° C., or a temperature of up to 60° C. in some cases.

The binary eutectic mixture may include an amide group-containing compound (a) and an ionizable lithium salt (b), but constitutional elements of the eutectic mixture and the contents of the elements are not particularly limited as long as the above described physical properties of the eutectic mixture can be shown.

The amide group-containing compound includes different two polar functional groups within a molecule, for example, a carbonyl group and an amine group. The polar functional groups different from each other serve as complexing agents that weaken the bond between the cation and the anion of the ionizable salt, thereby forming the battery mixture, resulting in a drop in the melting temperature. For example, the constitutional elements of the eutectic mixture, i.e. the amide group-containing compound and the lithium salt (LiY) cause the formation of a coordination bond between the carbonyl group (C=O) present in the amide group-containing compound and the lithium cation (Li$^+$) of the lithium salt, as well as the formation of a hydrogen bond between the anion (Y$^-$) of the lithium salt and the amine group (—NH$_2$) present in the amide group-containing compound. As a result, the amide group-containing compound and the lithium salt, which were originally present in a solid state, show a decreased melting point, while they form the battery mixture present in a liquid state at room temperature. In addition to the above functional groups, compounds comprising polar functional groups (e.g., an acidic group and a basic group) that can weaken the bond between a cation and anion of an ionizable salt, and thus are capable of forming the battery mixture, are also included in the scope of the present invention.

The amide group-containing compound may be an amide group-containing compound having a linear structure, a cyclic structure or a combination thereof. Non-limiting examples of the amine group-containing compound include C1~C10 alkyl amide, alkenyl amide, aryl amide or allyl amide compounds. Also, primary, secondary or tertiary amide compounds may be used. It is more preferable to use a cyclic amide compound showing a broader electrochemical window because such cyclic amide compounds have a smaller number of hydrogen atoms and are stable under a high voltage so as to prevent decomposition thereof. Non-limiting examples of the amide compound that may be used in the present invention include acetamide, urea, methyl urea, caprolactam, valerolactam, carbamate, trifluoroacetamide, methyl carbamate, formamide, formate, and mixtures thereof.

The other constitutional element forming the eutectic mixture according to the present invention includes any lithium-containing ionizable salts. Non-limiting examples of such salts include lithium nitrate, lithium acetate, lithium hydroxide, lithium sulfate, lithium alkoxide, lithium halides, lithium oxide, lithium carbonate, lithium oxalate, or the like. Particularly, LiN(CN)$_2$, LiClO$_4$, Li(CF$_3$)$_3$PF$_3$, Li(CF$_3$)$_4$PF$_2$, Li(CF$_3$)$_5$PF, Li(CF$_3$)$_6$P, Li(CF$_2$CF$_2$SO$_2$)$_2$N, Li(CF$_3$SO$_2$)$_2$N, LiCF$_3$SO$_3$, LiCF$_3$CF$_2$(CF$_3$)$_2$CO, Li(CF$_3$SO$_2$)$_3$C, Li(CF$_3$SO$_2$)$_3$C, LiCF$_3$(CF$_2$)$_7$SO$_3$, LiCF$_3$CO$_2$, LiCH$_3$CO$_2$, and mixtures thereof are preferred.

The eutectic mixture according to the present invention may be represented by the following Formula 1 or Formula 2, but is not limited thereto:

[Formula 1]

wherein each of $R_1$, $R_2$ and R independently represents a hydrogen atom, halogen atom, C1~C20 alkyl group, alkylamine group, alkenyl group or an aryl group;

X is selected from the group consisting of hydrogen, carbon, silicon, oxygen, nitrogen, phosphor and sulfur, with the proviso that where X is hydrogen, m=0, where X is oxygen or sulfur, m=1, where X is nitrogen or phosphor, m=2, and where X is carbon or silicon, m=3, each R being independent from the others; and Y is an anion capable of forming a salt with lithium.

[Formula 2]

wherein each of $R_1$ and R independently represents a hydrogen atom, C1~C20 alkyl group, alkylamine group, alkenyl group, aryl group or an allyl group;

X is selected from the group consisting of hydrogen, carbon, silicon, oxygen, nitrogen, phosphor and sulfur, with the proviso that where X is hydrogen, m=0 and n=0, where X is oxygen or sulfur, m=0, where X is nitrogen or phosphor, m=1, and where X is carbon or silicon, m=2, each R being independent from the others;

n is an integer of 0~10, with the proviso that where n is equal to or greater than 1, X is selected from carbon, silicon, oxygen, nitrogen, phosphor and sulfur, except hydrogen; and Y is an anion capable of forming a salt with lithium.

In the compound represented by the above Formula 1 or Formula 2, there is no particular limitation on anion Y of the lithium salt as long as it is capable of forming a salt with lithium. Non-limiting examples of such anions include: $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$; $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

Although there is no particular limitation on the melting point of the eutectic mixture according to the present invention, it is preferable that the eutectic mixture is in a liquid state at a temperature of up to 100° C., and more preferably at room temperature. Also, although there is no particular limitation on viscosity of the eutectic mixture according to the present invention, the eutectic mixture preferably has a viscosity of 100 cp or less, more preferably a viscosity of 1~80 cP.

The ternary eutectic mixture may be prepared by a conventional process known to one skilled in the art. For example, a compound having an amide group is mixed with a lithium salt and the carbonate-based compound at room temperature and then the mixture is allowed to react by heating it at a suitable temperature of 70° C. or less, followed by purification. Also, the ternary eutectic mixture may be prepared by forming a binary eutectic mixture by using an amide group-containing compound and a lithium salt, and adding the carbonate-based compound, followed by purification. Herein, the carbonate-based compound is included in an amount of less than 50 parts by weight based on 100 parts by weight of an electrolyte. And the molar ratio (%) of the amide-based compound to the lithium salt suitably ranges from 1:1 to 8:1, and more preferably from 2:1 to 6:1.

When the ternary eutectic mixture according to the present invention has a viscosity of 30 to 60 cP, and a concentration ratio ranging 3~4:1 of an amide group-containing compound to a lithium salt, the viscosity and ion concentration is optimized, resulting in significant improvement in the quality of the battery.

Actually, in the present invention, the addition of the carbonate-based compound to a binary eutectic mixture may cause improvement in the quality of the battery, such as a change in the physical properties of the eutectic mixture.

(1) The electrolyte comprising the aforementioned eutectic mixture shows a broader electrochemical window when compared to conventional organic solvents and ionic liquids due to the basic physical properties of the eutectic mixture, including physical stability of the eutectic mixture itself, so that the secondary batteries using the above electrolyte can have an extended range of drive voltage.

Additionally, the eutectic mixture contained in the electrolyte according to the present invention has no vapor pressure contrary to conventional solvents, and thus shows no problem of evaporation and exhaustion of the electrolyte. Also, the eutectic mixture has flame resistance, thereby improving the safety of the battery, even if the safety of the battery is lowered by external/internal factors. Moreover, the eutectic mixture itself is very stable, and thus can inhibit side reactions (for example, a side reaction between the cathode of high reactivity and the electrolyte when the battery is fully charged) in the electrochemical device. Further, high conductivity of the eutectic mixture can contribute to improvement of the quality of the battery. Furthermore, the eutectic mixture has a broad range of temperatures where it exists as a liquid, a high salvation capability and a non-coordinate bonding capability, and thus shows physico-chemical properties as an eco-friendly solvent.

(2) Additionally, since the eutectic mixture contains a lithium salt, the addition of a separate lithium salt can be avoided even in the case of a lithium secondary battery requiring intercalation/deintercalation of lithium ions into/from the cathode active material.

(3) Further, the eutectic mixture contains lithium ions ($Li^+$) only as cations, as compared to ionic liquids containing two types of cations. Thus, it is possible to solve the problem caused by such cations competing with each other and inhibiting lithium ion intercalation into the anode, and thus to facilitate smooth lithium ion conduction.

The ternary eutectic mixture according to the present invention may be applied to any electrolytes regardless of the forms of electrolytes. Preferably, the eutectic mixture may be applied to two types of electrolytes, i.e. liquid electrolytes and gel polymer electrolytes.

(1) According to an embodiment of the present invention, the electrolyte is a liquid type eutectic mixture-containing electrolyte, which may be obtained by using the ternary eutectic mixture alone.

(2) According to another embodiment of the present invention, the electrolyte is a gel polymer type electrolyte containing the ternary eutectic mixture. The gel polymer serves to support the ternary eutectic mixture. Thus, in this case, it is possible to solve the problem of electrolyte leakage, and to form an electrochemical device in the form of a thin film or other films.

First, ① the gel polymer electrolyte obtained via polymerization will be explained.

The gel polymer electrolyte according to the present invention may be formed by carrying out polymerization of an electrolyte precursor solution containing: the ternary eutectic mixture; monomers capable of forming a gel polymer via polymerization.

There is no limitation on the kind of monomer as long as it is capable of forming a gel polymer by polymerization, and particular examples of such monomers include vinyl monomers, etc. Vinyl monomers have advantages in that they can provide transparent polymerization products when mixed with the battery mixture and are amenable to simple polymerization conditions. Preferably, the monomer capable of forming a gel polymer by polymerization provides low volumetric shrinkage upon polymerization and permits in-situ polymerization inside of an electrochemical device.

Non-limiting examples of the vinyl monomer that may be used according to the present invention include acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene, para-cyanostyrene, etc.

The precursor solution of gel polymer electrolyte according to the present invention further comprises polymerization initiators, photoinitiators and/or additives known to one skilled in the art.

The gel polymer electrolyte may be prepared by using a method generally known to those skilled in the art. Preferably, the gel polymer electrolyte may be prepared through In-Situ polymerization within the battery by heating or UV irradiation. Herein, the polymerization degree of the gel polymer may be controlled depending on the reaction factors, including the polymerization time, polymerization temperature or irradiation dose. The polymerization time varies with the kind of the initiator used for the polymerization and the polymerization temperature. Preferably, the polymerization time is sufficient to prevent the gel polymer electrolyte from leaking during the polymerization. Also, the polymerization should be performed for a period of time sufficient to prevent over-polymerization and shrinking of the electrolyte. For example, the polymerization time generally ranges from 20 minutes to 60 minutes, and the polymerization temperature ranges from 40° C. to 80° C.

Further, the composition of the electrolyte precursor solution for forming the gel polymer electrolyte according to the present invention may be suitably controlled considering the quality and safety of the battery. There is no particular limitation in the composition of the electrolyte precursor solution. In this regard, the mixing ratio in the electrolyte precursor solution according to the present invention on the weight basis, i.e., the weight ratio of (ternary eutectic mixture) x:(monomer capable of forming a gel polymer by polymerization) y:(polymerization initiator) z, is 0.5~0.95:0.05~0.5: 0.00~0.05, with the proviso that x+y+z=1. More preferably, x is 0.7~0.95, y is 0.05~0.3 and z is 0.00~0.01.

② According to another preferred embodiment of the gel polymer electrolyte comprising the eutectic mixture according to the present invention may be obtained not by the aforementioned in-situ polymerization but by injecting the ternary eutectic mixture to a preliminarily formed polymer or gel polymer so that the polymer or gel polymer is impregnated with the ternary eutectic mixture.

Non-limiting examples of the polymer that may be used in the present invention include polymethyl methacrylate, polyvinylidene difluoride, polyvinyl chloride, polyethylene oxide, polyhydroxyethyl methacrylate, etc. Any gel polymers known to one skilled in the art may also be used. In this case, it is possible to simplify processing steps compared to the above in-situ polymerization method.

③ According to still another preferred embodiment of the present invention, a polymer and the ternary eutectic mixture are dissolved in a solvent, and then the solvent is removed to form a gel polymer electrolyte. Herein, the ternary eutectic mixture is included in the polymer matrix.

There is no particular limitation on selecting the solvent. Additionally, there is no particular limitation on the method for removing the solvent and any conventional heating methods may be used. The third method has a disadvantage in that there is a need of a post-treatment step for removing a solvent in order to form the gel polymer electrolyte.

The electrolyte according to the present invention, which may be prepared by the above described various methods, may further include a first compound forming a passivation layer (a protective layer) and a second compound for protecting the battery from overcharge.

The first compound can cover a range of potentials beyond the electrochemical window of the eutectic mixture, and can be reduced in advance of the other components upon the first charge to form an SEI layer with ease. Preferably, the first compound has a higher reduction potential vs. lithium potential (vs. Li/Li$^+$) than the lowest limit of the electrochemical window of the eutectic mixture. For example, a voltage of 1V or less is usually applied when a carbon electrode is used as the anode, and thus, in order to prevent the decomposition of an electrolyte, the first compound may have a reduction potential (vs. Li/Li$^+$) of 0~2 V.

The first compound is reduced and decomposed upon the first charge of the battery to form a solid electrolyte interface (SEI) layer. The resultant SEI layer can prevent side reactions between the anode active material and an electrolyte solvent, and also a structural collapse of the anode active material caused by the co-intercalation of the electrolyte solvent into the anode active material. Additionally, the SEI layer serves satisfactorily as a tunnel for transferring lithium ions so as to minimize degradation of the quality of the battery. Further, the SEI layer can prevent the decomposition of the eutectic mixture and degradation of the quality of the battery caused thereby.

Non-limiting examples of the first compound that may be used in the present invention include 12-crown-4, 18-crown-6, catechol carbonate, vinylene carbonate, ethylene sulfite, methyl chloroformate, succinimide, methyl cinnamate or a mixture thereof.

The second compound has a higher oxidation potential vs. lithium potential (Li/Li$^+$) than the cathode potential. The second compound may be oxidized at a higher voltage than the normal drive voltage of the cathode (e.g. 4.2V), and consumes an overcharged current upon the oxidation via gas generation, formation of a passivation layer and a reversible redox shuttle to improve the safety of the battery. Non-limiting examples of the second compound include iodine, ferrocene-based compounds, triazolium salts, tricyanobenzene, tetracyanoquinodimethane, benzene-based compounds, pyrocarbonates, cyclohexylbenzene (CHB) or a mixture thereof.

The first compound and/or the second compound may be used in an amount controlled in a range currently used in the art in consideration of the quality of the battery. For example, the first compound and/or the second compound may be used in an amount of 0.01~10 parts by weight based on 100 parts by weight of the electrolyte, respectively.

<Secondary Battery Using Electrolyte Comprising Ternary Eutectic Mixture>

The secondary battery according to the present invention comprises the anode, the cathode, the electrolyte and a separator.

Herein, the secondary battery includes all types of secondary batteries in which electrochemical reactions are performed continuously through repeated charge/discharge cycles. Preferably, the secondary batteries are lithium secondary batteries and non-limiting examples of the lithium secondary battery include lithium metal secondary batteries, lithium ion secondary batteries, lithium polymer secondary batteries or lithium ion polymer batteries.

The secondary battery may be manufactured by using a method generally known to those skilled in the art. According to one embodiment of the method, both electrodes (the cathode and the anode) are stacked with a separator interposed between both electrodes to form an electrode assembly, and then the electrolyte containing the ternary eutectic mixture is injected thereto.

The cathode and the anode may be obtained by a conventional method known to those skilled in the art. Particularly, electrode slurry containing each electrode active material, i.e. the cathode active material or the anode active material, is provided, the electrode slurry is applied onto each current collector, and the solvent or dispersant is removed.

The cathode active material that may be used in the present invention includes conventional cathode active materials currently used in the art. For example, metals or metal oxides with a potential vs. lithium ($Li/Li^+$) of 4V or more may be used with no particular limitation. Non-limiting examples of the cathode active material include $LiCoO_2$, $LiNiO_2$, $LiMnO_2$, $LiMn_2O_4$, $LiCrO_2$, $LiFePO_4$, $LiFeO_2$, $LiCoVO_4$, $LiCr_xMn_{2-x}O_4 (0<x<2)$, $LiNiVO_4$, $LiNi_xMn_{2-x}O_4 (0<x<2)$, $Li_{2-x}CoMn_3O_8 (0<x=2)$, oxides represented by the formula of $Li_{ix}[Ni_{2-y}M_yO_4]$ $(0<x<1, 0<y<2)$ having a spinel type structure, or the like.

In the above oxides ($Li_xNi_{2-y}M_yO_4$), M represents at least one transition metal generally known to those skilled in the art, other than nickel, and non-limiting examples thereof include Mn, Co, Zn, Fe, V or a combination thereof. Additionally, x and y are preferably $0 \leq x \leq 1.1$, $0.75 \leq y \leq 1.80$, but are not limited thereto.

Anode active materials may include any conventional anode active materials currently used in the anode of a conventional secondary battery. Non-limiting examples of the anode active material that may be used in the present invention include carbonaceous materials, petroleum coke, activated carbon, graphite, $WO_3$, $MoO_3$, $LiCr_3O_8$, $LiV_3O_8$, $TiS_2$, oxides represented by the formula of $Li_xTi_{5/3-y}L_yO_4$, such as $Li_{4/3}Ti_{5/3}O_4$ having a spinel type structure, a mixture thereof, or the like.

In the above oxide ($Li_xTi_{5/3-y}L_yO_4$), L represents at least one element selected from the group consisting of Group 2 to Group 16 elements, except Ti and O, and non-limiting examples of substituent element L include Be, B, C, Mg, Al, Si, P, Ca, Sc, V, Cr, Mn, Fe, Co, Ni, Cu, Zn, Ga, Ge, As, Se, S, Y, Zr, Nb, Mo, Pd, Ag, Cd, In, Sn, Sb, Te, Ba, La, Ta, W, Hg, Au, Pb or a combination thereof. Additionally, x and y are preferably $4/3 \leq x \leq 7/3$ and $0 \leq y \leq 5/3$, but are not limited thereto.

Particularly, according to the present invention, it is possible to prevent the decomposition of the electrolyte caused by the electrochemical reactions occurring at the anode in a range of potentials beyond the electrochemical window of the eutectic mixture. Thus, it is possible to use any anode active material whose reduction potential vs. lithium potential ($Li/Li^+$) is beyond the electrochemical window of the eutectic mixture (e.g. a carbonaceous material and/or metal oxide having a reduction potential vs. lithium potential ($Li/Li^+$) is lower than 1V) with no particular limitation. Therefore, the present invention can provide secondary batteries having a high discharge capacity and improved lifespan and safety by using anodes comprising various carbonaceous materials.

Also, on the surface of the anode according to the present invention, a coating layer may be partially or totally formed, or may be preliminarily coated before the first charge, the coating layer including a first compound reduced at a higher potential (vs. $Li/Li^+$) than the ternary eutectic mixture or a reduced product thereof.

The anode may be prepared by coating the first compound on the surface of the above described anode active material or a pre-formed anode, or by using the first compound as the anode material, before the battery is assembled. Also, when the anode is subjected to charge/discharge cycles in the presence of the electrolyte including the ternary eutectic mixture, the first compound in the electrolyte may be formed on the surface of the anode active material together with reversible lithium ions. Also, an SEI layer may be formed on the anode by the carbonate-based compound.

The first compound is the same as defined above. The electrode may be coated and manufactured according to conventional methods. The eutectic mixture according to the present invention includes polar functional groups, such as a carbonyl group, an amine group, and a lithium salt, and thus has high polarity. Accordingly, when a separator includes a polar component having affinity with the eutectic mixture, the impregnation of the eutectic mixture within a pore can be well performed, and thus solvated lithium ions can more freely move, thereby improving the operation performance of the battery. Therefore, the separator may include a polycarbonate (PC) based polymer including at least one polar functional group, a cellulose based polymer, or a copolymer of the polymers and a heteropolymer.

Non-limiting examples of the separator include a polypropylene-based, polyethylene-based or polyolefin-based separator, or a composite porous separator comprising inorganic materials incorporated into the porous separator.

In addition to the above constitutional elements, the secondary battery may further comprise conductive elastic polymers for filling the remaining space of the secondary battery.

There is no particular limitation on the outer shape of the lithium secondary battery obtained in the above-described manner. The lithium secondary battery may be a cylindrical battery using a can, a prismatic battery, or a pouch-type battery.

BRIEF DESCRIPTION OF THE DRAWINGS

The foregoing and other objects, features and advantages of the present invention will become more apparent from the following detailed description when taken in conjunction with the accompanying drawings in which.

MODE FOR THE INVENTION

Reference will now be made in detail to the preferred embodiments of the present invention. It is to be understood that the following examples are illustrative only and the present invention is not limited thereto.

Example 1

1-1. Preparation of the Ternary Eutectic Mixture (TEM)

4 g of purified methyl carbamate and 6 g of $Li(CF_3SO_2)_2N$ were added to a round-bottomed flask, and then the mixture was slowly agitated at 40° C. under a nitrogen atmosphere for 5 hours to obtain a binary eutectic mixture. Next, 1 g of ethylene carbonate was added to obtain a ternary eutectic mixture. Herein, a melting point of the eutectic mixture was less than 60° C.

1-2. Preparation of the Lithium Secondary Battery (Preparation of the Cathode)

$LiCoO_2$ as the cathode active material, as artificial graphite as a conductive material, polyvinylidene fluoride as a binder were mixed in a weight ratio of 94:3:3, and to the obtained mixture, N-methylpyrrolidone was added to prepare slurry. The prepared slurry was applied to aluminum foil, and a drying process was carried at 130° C. for 2 hours to obtain the cathode.

(Preparation of the Anode)

$Li_{4/3}Ti_{5/3}O_4$ as the anode active material, artificial graphite and a binder were mixed i a weight ratio of 94:3:3, and then N-methylpyrrolidone was added to prepare slurry. The prepared slurry was applied to copper foil, and a drying process was carried at 130° C. for 2 hours to obtain an anode.

(Preparation of the Battery)

Each of the cathode and the anode as prepared above was prepared with a size of 1 $cm^2$, and a paper separator was intervened therebetween. Then, an electrolyte of the ternary eutectic mixture obtained by Example 1-1 was injected, and a secondary battery was finally obtained.

When the secondary battery prepared in this manner includes the cathode having an operating potential of about 3.8V, the anode having an operating potential vs. lithium potential of about 1.4V, and the ternary eutectic mixture electrolyte having an electrochemical window of 0.5 to 5.5V, the battery has drive voltage of about 2.4V and high energy density, and is stable under overcharge, overdischarge, short circuit, and thermal shock.

Example 2~5

The lithium secondary battery including a ternary eutectic mixture and an electrolyte of the ternary eutectic mixture was obtained in the same manner as described in Example 1, except that materials according to various ratios as noted in Table 1, instead of purified methyl carbamate and $Li(CF_3SO_2)_2N$, were used.

Comparative Example 1

The lithium secondary battery was obtained in the same manner as described in Example 1, except that a solution including 1M of $LiPF_6$ dissolved in a 1:2 mixed solution of ethylene carbonate and ethylmethyl carbonate, instead of a ternary eutectic mixture, was used as an electrolyte.

Comparative Example 2

The lithium secondary battery was obtained in the same manner as described in Example 1, except that a binary eutectic mixture prepared by using 4.7 g of purified methyl carbamate, and 6 g of $Li(CF_3SO_2)_2N$ was used.

Comparative Example 3

The lithium secondary battery was obtained in the same manner as described in Example 1, except that a composition prepared by using 0.5 g of purified methyl carbamate, 4.2 g of ethylene carbonate, and 3 g of $Li(CF_3SO_2)_2N$ was used. Herein, the content of the carbonate was 55 parts by weight based on based on 100 parts by weight of an electrolyte.

Experimental Example 1

Determination on Self-Extinguish-Ability of the Ternary Eutectic Mixture

To the eutectic mixture prepared by mixing 5 g of purified methyl carbamate and 6 g of $Li(CF_3SO_2)_2N$, ethylene carbonate (EC) was added in various amounts to obtain ternary eutectic mixtures. On each of the obtained ternary eutectic mixtures, a self-extinguishing time (SET) was measured. In this test, 0.5 cm of glass wool soaked in 125 mg of a ternary electrolyte is heated by a gas lighter for 5 seconds, and then an extinguishing time is measured.

In the case of a control group using only ethylene carbonate (EC) as an electrolyte solvent, ignition was maintained for about 55 seconds ($SET_0$=55 seconds), and on the other hand, in the case of the battery according to the present invention using a ternary eutectic mixture including less than 50% of EC, ignition was maintained for 5 seconds (SET=5 seonds). Herein, a relative self-extinguish time (1-SET/$SET_0$) is 0.91. Such a ternary eutectic mixture has frame resistance. Flammability, flame retardancy, and flame resistance all depend on the relative self-extinguish time (1-SET/$SET_0$), based on 0<flammability<0.67<flame retardancy<0.9<flame resistance<1 (*J. Power Sources,* 135 (2004), 291).

FIG. 1 illustrates flame resistance according to a change in a mixed ratio of a ternary eutectic mixture, and herein, it is found that a ternary eutectic mixture including less than 50% of EC has flame resistance.

Experimental Example 2

Determination on Physical Properties of the Ternary Eutectic Mixture

In order to determine physical properties of a ternary eutectic mixture according to the present invention, the following tests were carried out.

As test samples, ternary eutectic mixtures prepared by Examples 1 to 5, and a binary eutectic mixture prepared by Comparative Example 2 were used, and the viscosity was measured at 25° C. by a viscometer RS 150. Table 1 shows physical properties of eutectic mixtures and properties of batteries using the eutectic mixtures.

TABLE 1

|  | Amide (%) | Carbonate (%) | Salt | Salt M ratio | viscosity μ (cP) | conductivity κ (mS/cm) | Discharge capacity | Discharge efficiency |
|---|---|---|---|---|---|---|---|---|
| Exp. 1 | Methyl carbamate (80) | EC (20) | LiTFSI | 3:1 | 74.0 | 1.51 | 99% | 99% |
| Exp. 2 | Methyl Carbamate (50) | EC (50) | LiTFSI | 3:1 | 70.3 | 1.52 | 98% | 99% |
| Exp. 3 | Methyl Carbamate (90) | EC (10) | LiTFSI | 3:1 | 75.9 | 1.54 | 99% | 99% |
| Exp. 4 | Methyl Carbamate (95) | EMC (5) | LiTFSI | 3:1 | 58.4 | 1.74 | 99% | 97% |
| Exp. 5 | Methyl Carbamate (80) | EC (20) | LiTFSI | 2:1 |  |  |  |  |
| Comp. Exp. 2 | Methyl carbamate (100) | — | LiTFSI | 3:1 | 82 | 1.2 | 97% | 98% |

Experimental Example 3

Determination on Thermal Stability of the Battery

In order to determine stability of a lithium secondary battery including a ternary eutectic mixture according to the present invention as an electrolyte, the following tests were carried out.

As test samples, the lithium secondary battery prepared by Example 1, which includes the ternary eutectic mixture as the electrolyte, and the lithium secondary battery prepared by Comparative Example 1, which includes the electrolyte including a mixture of EC and EMC, instead of the eutectic mixture, were used. Each battery was charged at 23° C. to 4.2V (vs. Li), and was disassembled to obtain the cathode. Then, on the obtained cathode, thermal stability to the cathode and an electrolyte was tested by using a differential scanning calorimetry (DSC).

Figure 4:
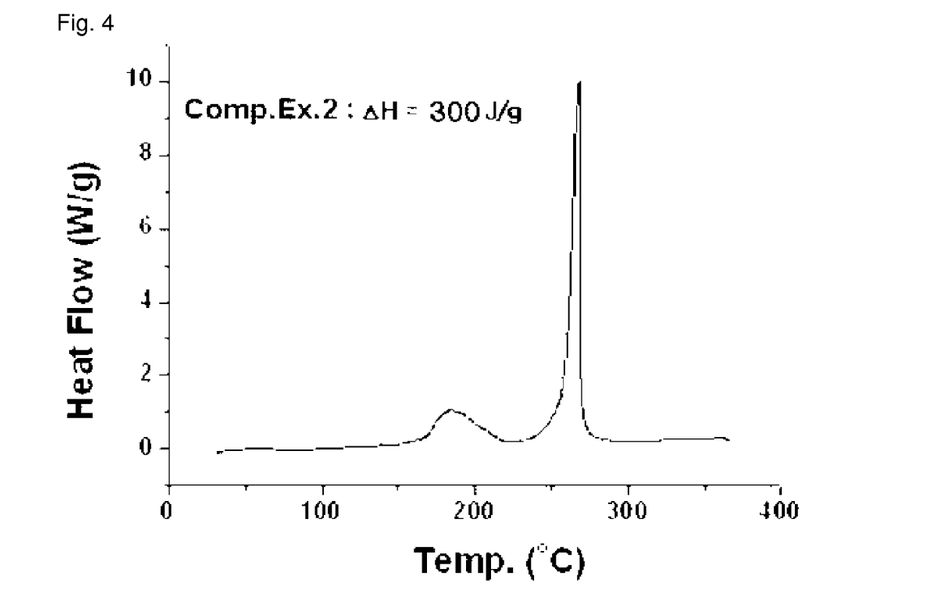
FIG. 4 is a graph illustrating a DSC analysis on a charged $LiCoO_2$ electrode in a lithium secondary battery prepared by Comparative Example 1, which is using a mixture of ethylene carbonate(EC) and ethylmethyl carbonate(EMC) in the ratio of 1:2 as an electrolyte.

From the test results, it is determined that compared to the battery including the electrolyte including a mixture of EC and EMC, which was prepared by Comparative Example 1, the battery including the ternary eutectic mixture, which was prepared by Example 1, shows a significantly decreased heat value(see FIGS. 3 and 4). Actually, on the battery prepared by Comparative Example 1, heat generation occurred at 170° C., and the heat value was 300 J/g (see FIG. 4), and on the other hand, on the battery prepared by Example 1, heat generation occurred at 150 to 230° C., and the heat value was 72 J/g (see FIG. 3).

Accordingly, it is determined that in the lithium secondary battery according to the present invention, which includes the electrolyte including the ternary eutectic mixture, side reactions between the electrode active material and the electrolyte can be significantly inhibited, thereby improving thermal stability of the battery.

Experimental Example 4

Determination on Overcharge of the Battery the battery was obtained by injecting 2.3 g of the ternary eutectic mixture prepared by Example 1 into a commercially available polymer battery, and in a control group of the obtained battery, the composition prepared by Comparative Example 3 was used as the electrolyte. The obtained battery was charged to 12V with current of 800 mA, and then after maintenance of the charged state for 2 hours, an overcharge test was carried.

In result, in the polymer battery prepared by Comparative Example 3, explosion occurred, and on the other hand, in the polymer battery prepared by Example 1, explosion had not occurred, in spite of its expansion.

Experimental Example 5

Determination on the Quality of the Battery

In order to determine the quality of the lithium secondary battery including the ternary eutectic mixture according to the present invention as the electrolyte, the following tests were carried out.

On the lithium secondary battery prepared by Example 1, which includes the ternary eutectic mixture as the electrolyte, a cycle property test was carried. As a control group, the lithium secondary battery prepared by Comparative Example 1, which includes the carbonate-based compound, was used.

Figure 2:
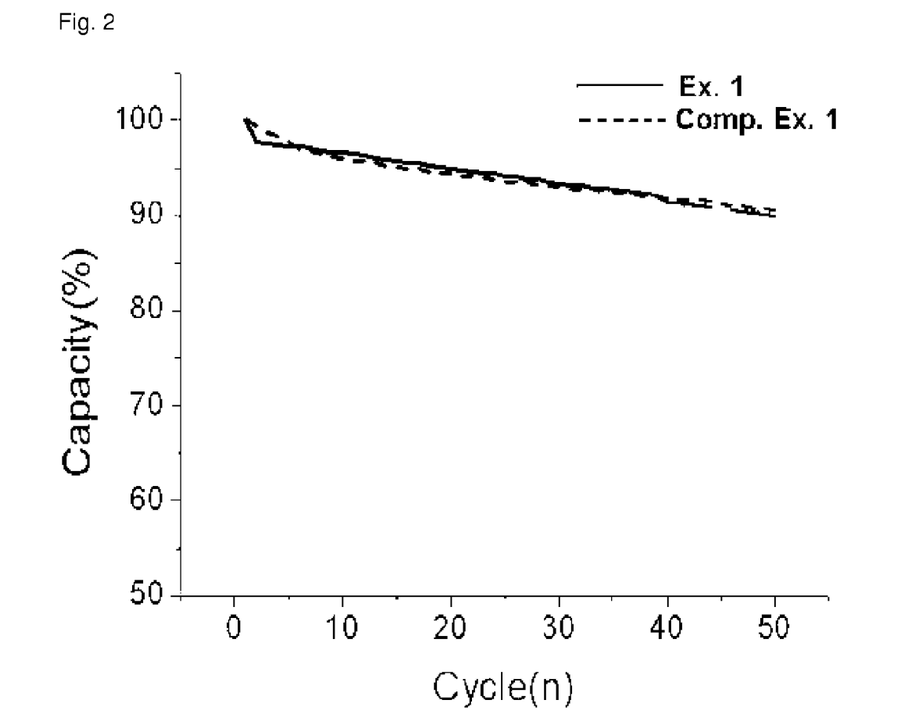
FIG. 2 is a graph illustrating cycle properties of lithium secondary batteries using electrolytes prepared by Example 1 and Comparative Example 1.

In result, the lithium secondary battery prepared by Comparative Example 1 showed a discharge capacity of 99% at a second cycle, and charge/discharge efficiency of 99%. Also, it is determined that the battery prepared by Example 1, which includes the ternary eutectic mixture electrolyte, has quality at a similar level to Comparative Example 1 from the standpoint of discharge capacity and charge/discharge efficiency (see FIG. 2).

INDUSTRIAL APPLICABILITY

As can be seen from the foregoing, the secondary battery according to the present invention uses the ternary eutectic mixture having economical efficiency and high thermal/chemical stability as the electrolyte, and thus it is possible to inhibit the ignition of the electrolyte and to minimize side reactions between the battery constitutional element and an electrolyte, thereby improving the thermal stability of the battery. Also, due to a broader electrochemical window and high conductivity of the eutectic mixture, the quality of the battery may be improved. Additionally, the use of the ternary eutectic mixture improves economical efficiency because the ternary eutectic mixture can be easily prepared, compared to a conventional ionic liquid, and contains a lithium salt, thereby eliminating the need for an additional lithium ion.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

What is claimed is:

1. A secondary battery comprising a cathode, an anode, a separator, and an electrolyte,
   wherein the electrolyte comprises a ternary eutectic mixture containing a carbonate based compound and a eutectic mixture containing an amide group-containing compound and an ionizable lithium salt, and the carbonate-based compound is included in an amount of from 0.001 parts to 50 parts by weight based on 100 parts by weight of the electrolyte, wherein the carbonate-based compound is at least one kind of material selected from the group including propylene carbonate(PC), ethylene carbonate(EC), diethyl carbonate(DEC), dimethyl carbonate(DMC), dipropyl carbonate(DPC), butylene carbonate, methylpropyl carbonate, ethylpropyl carbonate, and ethylmethyl carbonate(EMC), and
   wherein the eutectic mixture containing the amide group-containing compound and the lithium salt is represented by the following Formula 1 or Formula 2, Formula 1 wherein each of $R_1$, $R_2$ and R independently represents a hydrogen atom, a halogen atom, a C1~C20 alkyl group, an alkylamine group, an alkenyl group or an aryl group;
X is selected from the group consisting of hydrogen, carbon, silicon, oxygen, nitrogen, phosphor and sulfur, with the proviso that where X is hydrogen, m=0, where X is oxygen or sulfur, m=1, where X is nitrogen or phosphor, m=2, and where X is carbon or silicon, m=3, each R being independent from the others; and
Y is an anion capable of forming a salt with a lithium ion; or Formula 2 wherein each of $R_1$ and R independently represents a hydrogen atom, a C1~C20 alkyl group, an alkylamine group, an alkenyl group, an aryl group or an allyl group;
X is selected from the group consisting of hydrogen, carbon, silicon, oxygen, nitrogen, phosphor and sulfur, with the proviso that where X is hydrogen, m=0 and n=0, where X is oxygen or sulfur, m=0, where X is nitrogen or phosphor, m=1, and where X is carbon or silicon, m=2, each R being independent from the others;

n is an integer of 0~10, with the proviso that where n is equal to or greater than 1, X is selected from carbon, silicon, oxygen, nitrogen, phosphor and sulfur, except hydrogen; and
Y is an anion capable of forming a salt with a lithium ion.

2. The secondary battery as claimed in claim 1, wherein the electrolyte satisfies a range of a relative self-extinguish time [1−$SET_{TEM}$/$SET_C$], which is represented by Mathematical Formula 1:

$$0.67 < 1 - SET_{TEM}/SET_C < 1 \qquad \text{[Mathematical Formula 1]}$$

wherein $SET_{TEM}$ represents a self-extinguish time (SET) from ignition to extinguishing of a certain amount of the ternary eutectic mixture, and $SET_C$ represents a self-extinguish time (SET) from ignition to extinguishing of a certain amount of the carbonate-based compound.

3. The secondary battery as claimed in claim 1, wherein a molar ratio (%) of the amide group-containing compound to the lithium salt ranges from 1:1 to 8:1.

4. The secondary battery as claimed in claim 1, wherein the amide group-containing compound is at least one kind of material selected from the group including acetamide, N-ethyl acetamide, urea, methyl urea, caprolactam, N-methyl caprolactam, oxazolidinone, N-hexyl oxazolidinone, valerolactam, trifluoroacetamide, and formamide.

5. The secondary battery as claimed in claim 1, wherein an anion of the lithium salt is at least one kind of material selected from the group including $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $(CF_3CF_2SO_2)_2N^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

6. The secondary battery as claimed in claim 1, wherein the electrolyte comprises: (a) a first compound capable of forming a passivation layer by being reduced upon a first charge at a higher potential vs. lithium potential (vs. Li/Li$^+$) than a lowest limit of an electrochemical window of the ternary eutectic mixture; (b) a second compound for consuming an overcharged current due to a higher oxidation potential vs. lithium potential (Li/Li$^+$) than a cathode potential; or both the first and second compounds.

7. The secondary battery as claimed in claim 1, wherein the anode has a coating layer partially or totally formed on the surface thereof, the coating layer comprising a first compound reduced at a higher potential (vs. Li/Li$^+$) than the ternary eutectic mixture or a reduced product thereof.

8. The secondary battery as claimed in claim 7, wherein the anode is prepared, before a first discharge, (a) by coating the first compound on a surface of an anode active material or a prefabricated anode, or (b) by using the first compound as an anode material.

9. The secondary battery as claimed in claim 1, wherein the separator comprises a polycarbonate (PC) based polymer including at least one polar functional group, a cellulose based polymer, or a copolymer of the polymers and a heteropolymer.

10. The secondary battery as claimed in claim 1, wherein the electrolyte is (i) a liquid type electrolyte; (ii) a gel polymer type electrolyte formed by carrying out polymerization of an electrolyte precursor solution, the electrolyte precursor solution containing the ternary eutectic mixture, and monomers capable of forming a gel polymer via polymerization; or (iii) a polymer or gel polymer impregnated with the ternary eutectic mixture.

11. The secondary battery as claimed in claim 10, wherein the monomer is at least one kind of material selected from the group including acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene, and para-cyanostyrene.

12. The secondary battery as claimed in claim 10, wherein the electrolyte precursor solution further comprises polymerization initiators or photoinitiators, and a mixing ratio in the electrolyte precursor solution on the weight basis of 0.5-0.95: 0.05-0.5:0.00-0.05, when expressed in terms of (ternary eutectic mixture) x:(monomer operable for forming a gel polymer by polymerization) y:(polymerization initiator) z, with the proviso that x+y+z=1.

13. The secondary battery as claimed in claim 12, wherein the polymer is selected from the group including polymethyl methacrylate, polyvinylidene difluoride, polyvinyl chloride, polyethylene oxide, and polyhydroxyethyl methacrylate.

* * * * *